United States Patent [19]

Hicks

[11] 3,960,824
[45] June 1, 1976

[54] MERCAPTAN INITIATED POLYMERIZATION PROCESS CARRIED OUT IN THE PRESENCE OF OXYGEN

[75] Inventor: Darrell D. Hicks, Jeffersontown, Ky.

[73] Assignee: Celanese Coatings & Specialties Company, Louisville, Ky.

[22] Filed: July 9, 1971

[21] Appl. No.: 161,331

[52] U.S. Cl. .............................. 526/85; 204/159.22; 260/17 R; 260/33.2 R; 260/33.4 R; 260/33.6 UA; 260/78.4 R; 260/78.4 E; 260/79.5 C
[51] Int. Cl.$^2$................. C08F 218/02; C08F 220/06
[58] Field of Search .......... 260/80.81, 50.8, 88.7 R, 260/88.7 F, 85.5 N, 93.5 S, 86.1 E, 89.7 R, 80.3 N

[56] References Cited
UNITED STATES PATENTS

| | | | |
|---|---|---|---|
| 2,569,506 | 10/1951 | Vandenberg | 260/88.7 F |
| 3,222,328 | 12/1965 | LaCombe et al. | 260/80.81 |
| 3,325,458 | 6/1967 | Kim et al. | 260/80.81 |
| 3,370,050 | 2/1968 | Seiner | 260/80.81 |

*Primary Examiner*—Harry Wong, Jr.
*Attorney, Agent, or Firm*—Herbert P. Price; K. A. Genoni; T. J. Morgan

[57] ABSTRACT

Low molecular weight polymers of ethylenically unsaturated monomers are prepared by a bulk polymerization process using organic mercaptans as the polymerization catalysts and carried out in the presence of oxygen. These low molecular weight polymers find utility as high solids casting and coating resins.

9 Claims, No Drawings

3,960,824

1

MERCAPTAN INITIATED POLYMERIZATION PROCESS CARRIED OUT IN THE PRESENCE OF OXYGEN

BACKGROUND OF THE INVENTION

The field of art to which this invention pertains is processes for the polymerization of ethylenically unsaturated compounds, particularly polymerization processes involving the use of mercaptans.

Mercaptans are well known activators and chain transfer agents for the polymerization of ethylenically unsaturated compounds. As described in "Vinyl and Related Polymers", by C. E. Schildknecht, John Wiley & Sons, Inc., New York (1952) at pages 98–100, the use of a mercaptan regulator in the preparation of GR-S synthetic rubbers resulted in rubbers having greater softness and plasticity than the German Buna S rubber. In the aqueous emulsion polymerization of butadiene and styrene, mercaptans, such as lauryl mercaptan, were used in amounts from about 0.1 to 3.0 weight percent based on the weight of the monomers. During the course of the copolymerization, the lauryl mercaptan was gradually used up by combination with the polymer. GR-S synthetic rubber has been found to contain roughly one sulfur atom per macromolecule.

The radical addition of mercaptans to carbon-carbon unsaturates ["Organic Reactions," Volume 13, John Wiley & Sons, Inc., New York (1963), pages 164–190] is initiated by the usual free radical initiators, such as oxygen, peroxides, azonitriles, and ultraviolet radiation. The reaction is generally considered to proceed via a multistep chain mechanism:

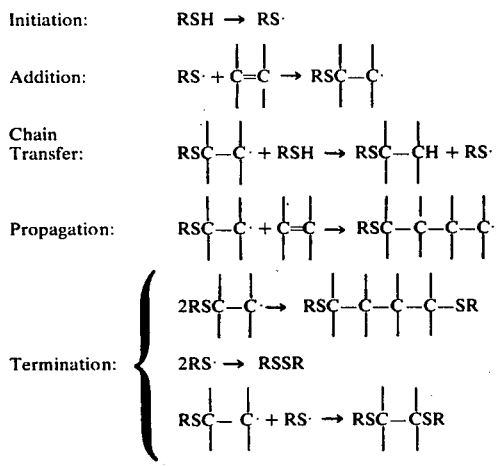

The generation of RS from the mercaptan is accomplished by means of the decomposition of a peroxide, an azonitrile, or other radical-generating species in the reaction mixture, by irradiation of the thiol with X-rays, gammma rays or beta rays, or by direct photolysis with ultraviolet radiation. When the addition of mercaptans to olefins is carried out with oxygen supplied to the reaction mixture, oxygen participates in the reaction and the initial product is a β-hydroperoxy sulfide. The hydroperoxide usually rearranges in the eaction mixture to the isomeric β-hydroxy sulfoxide which is the major product isolated.

U.S. Pat. No. 2,199,799 describes the reaction of thiophenols and acrylic esters in equimolar amounts to produce aryl thioethers of alkyl isobutyrates and alkyl substituted acrylic ester dimers. This reaction is conducted under strong light for a period of about one week.

U.S. Pat. No. 2,396,997 describes the preparation of high molecular weight linear polymers of unsaturated organic compounds using conventional polymerization catalysts and mercaptans as modifiers.

U.S. Pat. No. 2,888,442 describes the preparation of gel free polymers and copolymers of butadiene ranging from liquids to materials resembling art gum in texture using large amounts of mercaptans as modifiers. These polymers are prepared by emulsion polymerization using conventional polymerization catalysts.

In U.S. Pat. No. 3,028,367 low molecular weight copolymers of hydroxyalkyl acrylates are made by heating together in solution in a suitable solvent a mixture of one or more hydroxyalkyl acrylates and one or more alkyl acrylates in the presence of a free-radical-liberating agent as catalyst and an organic mercaptan which serves as a molecular weight regulator.

SUMMARY

This invention is directed to a process for preparing homopolymers and copolymers of ethylenically unsaturated monomeric compounds. In one aspect the invention pertains to a process for making low molecular weight polymers. In another aspect the invention relates to a bulk polymerization process using mercaptans as the only activators in the presence of oxygen or air.

In carrying out the process of this invention polymerizable ethylenically unsaturated monomers are brought into contact with a mercaptan in the presence of oxygen at a temperature of about 20°C. to about 200°C. for a time sufficient to obtain substantially complete conversion of the monomers to polymers, i.e., at least about 80% conversion. The reaction is preferably conducted as a bulk polymerization, i.e., carried out in the absence of solvent, using no polymerization catalyst except the mercaptan and oxygen. In carrying out the process of this invention, low to medium molecular weight products can be produced as desired. Heat of reaction is easily controlled so that elaborate means to manage exothermic reactions are not needed. Since the reaction is conducted in the absence of solvent, the polymers can be utilized in 100% solids applications with a minimum of stripping operations.

DESCRIPTION OF THE INVENTION

Compounds suitable for homopolymerization and/or copolymerization in the process of this invention include monomers in the following classes:

1. Polymerizable organic compounds containing a single ethylenic double bond conjugated with a carbon to oxygen double bond, i.e., compounds containing the structure

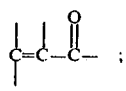

2. Polymerizable organic compounds containing a single ethylenic double bond conjugated with a carbon to nitrogen triple bond, i.e., compounds containing the structure

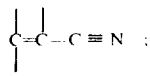

3. Polymerizable organic compounds containing a single ethylenic double bond conjugated with a carbon atom in an aromatic nucleus.

Examples of monomers in class 1 include acrylic, methacrylic, ethacrylic and crotonic acids, esters, wherein the ester group contains one to 18 carbon atoms, amides, alkylol amides and alkoxyalkyl amides, wherein the alkyl group contains 1 to about 4 carbon atoms and the alkoxy group contains 1 to about 8 carbon atoms.

Specific examples of class 1 monomers are methyl acrylate, ethyl acrylate, isopropyl acrylate, butyl acrylate, 2-ethylhexyl acrylate, dodecyl acrylate, octadecyl acrylate, methyl methacrylate, butyl methacrylate, 2-ethylhexyl methacrylate, ethyl ethacrylate octyl ethacrylate, methyl crotonate, heptyl crotonate, cyclohexyl acrylate, cyclohexyl methacrylate, benzyl acrylate, isobornyl acrylate and phenyl methacrylate.

Also included as useful ester monomers are hydroxyalkyl esters of acrylic, methacrylic, ethacrylic or crotonic acids wherein the hydroxyalkyl group contains 2 to 10 carbon atoms and is, preferably, a beta-hydroxyalkyl group. Examples of hydroxyalkyl ester monomers are beta hydroxyethyl acrylate, beta hydroxyethyl methacrylate, beta hydroxyethyl crotonate, beta hydroxyethyl ethacrylate, beta hydroxypropyl acrylate, beta-hydroxy propyl methacrylate, gamma hydroxypropyl methacrylate, beta-hydroxybutyl acrylate, gamma hydroxy butyl methacrylate, delta hydroxybutyl crotonate, beta hydroxyoctyl acrylate and beta hydroxy-decyl methacrylate.

Also included as useful monomers in class 1 are alpha-beta ethylenically unsaturated dicarboxylic acids and anhydrides such as maleic acid, maleic anhydride, fumaric acid, itaconic acid and mesaconic acid. Also included are the mono- and di-esters of these acids with alcohols containing 1 to 18 carbon atoms as well as the mono and di hydroxyalkyl esters wherein the alkyl group contains 2 to 10 carbon atoms.

Other monomers in class 1 are acrylamide, methacrylamide, crotonamide, methylol acrylamide, methoxymethyl acrylamide, butoxymethyl acrylamide, 2-ethylhexoxymethyl methacrylamide and the like.

Homopolymerizable and/or copolymerizable monomers in class 2 are acrylonitrile, methacrylonitrile, ethacrylonitrile, crotonic nitrile, etc.

Polymerizable monomers in class 3 include styrene, vinyl toluene, vinyl naphthalene, chlorostyrene, bromostyrenes and the like.

The mercaptans useful in this invention are organic mercaptans which contain at least one - SH or thiol group and which are classified as aliphatic, cycloaliphatic, or aromatic mercaptans. Useful mercaptans have from 1 up to about 4 thiol groups per molecule and contain from 1 to about 12 carbon atoms per thiol group, preferably 2 to 8 carbon atoms. These organic mercaptans can contain other substituents in addition to hydrocarbon groups, such substituents including carboxylic acid groups, hydroxyl groups, ether groups, ester groups, sulfide groups, amine groups and amide groups. Examples of useful mercaptan include methyl mercaptan, ethyl mercaptan, butyl mercaptan, octyl mercaptan, lauryl mercaptan, mercaptoethanol, mercaptopropanol, mercaptobutanol, mercaptoacetic acid, mercaptopropionic acid, thiomalic acid, benzyl mercaptan, phenyl mercaptan, cyclohexyl mercaptan, 1-thioglycerol, 2,2'-dimercaptodiethyl ether, 2,2'-dimercaptodipropyl ether, 2,2'-dimercaptodiisopropyl ether, 3,3'-dimercaptodipropyl ether, 2,2'-dimercaptodiethyl sulfide, 3,3'-dimercaptodipropyl sulfide, 1,11-dimercapto-3,9-dioxa-6-thiaundecane, bis($\beta$-mercaptoethoxy) methane, bis($\beta$-mercaptoethylthio)methane, ethanedithio-1,2, propanedithiol-1,2, butanedithiol-1,4, 3,4-dimercaptobutanol-1, trimethylolethane tri(3-mercaptopropionate), pentaerythritol tetra(3-mercaptopropionate), trimethylolpropane trithioglycolate and pentaerythritol tetrathioglycolate.

The process of this invention, i.e., the homo- or copolymerization of ethylenically unsaturated monomers with mercaptans is conducted in the presence of oxygen or air. It is well known that oxygen exerts an inhibiting effect upon the free radical polymerization of monomers, particularly acrylic esters ("Vinyl and Related Polymers", Ibid.) and that the presence of oxygen, even the small amount dissolved in the monomers, results in sufficient inhibition to require an induction period before polymerization occurs. However, in the process of this invention, oxygen is not an inhibitor, but actually exerts an accelerating effect. In the absence of other energy sources, such as ultra-violet or X-ray radiation or peroxides, oxygen is essential for the generation of free radicals, the RS·, from the mercaptan, RSH. Although the presence of dissolved air or oxygen in the monomers is sufficient to initiate and accelerate the polymerization reaction, it is preferred to at least blanket the reactants with oxygen or air but preferably to bubble air through the reactants during the course of the reaction. The rate of the flow of air can vary within wide limits just as long as there is a sufficient flow to keep a stream of air bubbles in contact with the reactants. Air flows have been varied between about 1 to about 100 cubic centimeters per minute based on a batch size of 500 grams of monomer with a preferred air flow for this batch size being about 15 to 35 cubic centimeters per minute. With larger batch sizes, a lower rate of air can be used, e.g., 1 cubic foot per hour for 100 to 150 pound batches. Air is introduced into the reactor at the start of the reaction and is continued for at least one hour up to the end of the reaction.

The reaction is carried out at room temperature up to about 200°C. and preferably 80°C to 150°C, under atmospheric pressures although subatmospheric or superatmospheric pressures can be used if desired or needed. The time required to conduct the process will, of course, depend upon the type monomers being polymerized, the type mercaptan, the amount of mercaptan, the temperature of the reaction, and the desired degree of reaction, i.e., the conversion of monomers to polymers. Generally, it is desirable to carry out the reaction to a conversion of at least 80%. The actual time required will vary between about 2 to about 20 hours.

Carboxylic acids have been found to be definite accelerators for the mercaptan initiated polymerizations. For instance, a mixture of ethyl acrylate monomers and mercaptoethanol (100 grams) wherein air is not excluded will exotherm at 25°C. in the presence of catalytic amounts of carboxylic acids to 80°–100°C. In the absence of carboxylic acid, the mixture never exotherms at 25°C, though slow polymerization does occur. Carboxylic acids can be introduced into the polymerization system as comonomers, e.g., acrylic acid, catalysts, e.g., mercaptopropionic acid, or as saturated, sulfur free carboxylic acids, e.g., acetic acid.

The amount of mercaptan that can be used in the process of this invention will vary depending upon the monomers being polymerized, the temperature at which the reaction is being conducted, the desired conversion rate, the type mercaptan that is being used and the type product that is desired. Generally, in this invention, about 0.01 to about 0.3 equivalent of mercaptan is used per each mol of polymerizable monomer. Preferred products are obtained when 0.05 to 0.25 equivalent of mercaptan is used with each mol of polymerizable monomer. Equivalent as used herein is determined by dividing the molecular weight of the mercaptan molecule by the number of mercapto groups in the molecule. Useful amounts of mercaptans, expressed on a weight basis, will vary from about 1 part to about 25 parts of mercaptan per 100 parts by weight of monomers to be polymerized. As the amount of mercaptan is increased the viscosity of the resulting polymer is decreased. For instance, 100 parts of ethyl acrylate were polymerized at 80°C. using 1.0, 3.0, 5.0 and 10.0 parts of mercaptoethanol. For purposes of comparison, a polymerization was conducted using 1.0 part of benzoyl peroxide. The viscosities of the resulting resins are tabulated below:

| Mercaptan parts | Viscosity at 100% solids | Viscosity at 60% solids in Xylene |
|---|---|---|
| 1.0 | Barely flowable | G-H |
| 3.0 | $Z_6$ | $A_1$ |
| 5.0 | $Z_5-Z_6$ | $A_3$ |
| 10.0 | X-Y | $A_5$ |
| 1.0 $Bz_2O_2$ | Tacky solid | $Z_1-Z_2$ |

In carrying out the process of this invention, any of the well known polymerization procedures can be used. For example, all of the monomers and the mercaptan catalyst can be added to the reactor, a sparge of air can be introduced below the surface of the monomers and heat with agitation can be applied. However, in order to be able to control the rate of reaction, it is preferred to either add the mercaptan catalyst incrementally to the reactor during the reaction or to add, as a dual feed, monomers and catalyst to a portion of the monomers heated to reaction temperature.

Any of the well known solvents can be used as a reaction medium for conducting the process of this invention, such solvents being aromatic, cycloaliphatic and aliphatic hydrocarbons, ketones, esters, ethers, alcohols and the like. However, as started hereinbefore it is preferred to carry out the polymerizations as bulk polymerizations wherein no solvent is used.

In the process of this invention the mercaptan becomes a part of the polymer chain through initiation and the addition reactions:

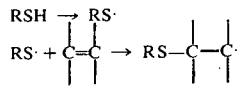

and can also become a part of the polymer chain in termination reactions:

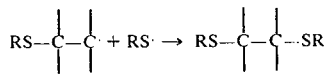

The structure of the mercaptan can have a considerable influence upon the properties of the polymeric product. For instance, carboxylic acid functionality can be incorporated into the polymer by using a carboxylic acid containing mercaptan, e.g., mercaptopropionic acid. Hydroxyl functionality can be introduced by using a mercaptan, such as mercaptoethanol. Other functional groups, such as amide, amine ester, ether, and polysulfide groups can be introduced by using mercaptans which contain such groups.

The type mercaptan can also be used to control or alter the structure of the polymer as desired. When a mono-mercaptan is used as the initiator, the polymer chain grows in one direction with the RS - being in the terminal position. If a di-mercaptan is used, the polymer chain grows in two directions with the —SRS— being in the middle of the chain. If tri- or higher functional mercaptans are used as initiators, then branched chain polymers are formed with the mercaptan nucleus being at the center of the polymer. By using mixtures of mono and poly mercaptans with different functional groups, a wide variety of novel polymers can be made.

The polymeric product may by the process of this invention have a wide variety of uses. Low molecular weight polymers which are free of functional and reactive groups can be used as plasticizers for coatings, films and the like. Compositions which contain hydroxyl and/or carboxyl groups, can be blended with polyisocyanates, amino resins, epoxy resins, etc., to form high solids or 100% solids thermosetting compositions useful as coatings, molding resins and the like. Compositions can be formulated into powder coatings which can be applied, as an example, by electrostatic spray techniques. Coating formulations, made at high to 100% solids can be applied by hot spray techniques. Low viscosity water soluble or water dispersible systems can be used in electrocoating processes. Functional polymers dissolved in reactive monomers find usage in radiation curing processes. In order to obtain 100% solids coating and molding compositions, the polymers, particularly hydroxy or carboxy containing copolymers can be blended with or dissolved in polyols, e.g., ethylene glycol, propylene glycol, polyoxyethylene glycols, polyoxypropylene glycols, alkylene oxide polymers containing as nuclei, trimethylolpropane, trimethylolethane, or pentaerythritol, hydroxy terminated polyesters and the like. The polymerizing reactions can also be conducted in the polyols using procedures described in U.S. Pat. Nos. 3,247,286 and 3,352,806. When further reacted with hydroxy reactive compositions, e.g., polyisocyanates and aminoplast resins, the polyols take part in the cure along with the hydroxy or carboxy containing copolymer.

The invention is further described by the following detailed examples. Parts and percentages where used are parts and percentages by weight.

EXAMPLE 1

To a 1 liter flask equipped with a stirrer, thermometer, reflux condenser and air sparger were added 500 parts of ethyl acrylate. A slow stream of air was introduced below the surface of the monomer and stirring was begun. Mercaptoethanol, 50 parts, was added and heat was applied. The temperature was raised to 79°C. and was controlled between 78° and 87°C. for a period of about 16 hours and 30 minutes. The product at the end of this heating period had a solids content of 85.3%. The flask was then fitted with a downward condenser and was heated to 104°C. under oil pump vacuum to remove unreacted monomer. The resulting polymer had a Gardner-Holdt viscosity at 25°C. of X-Y and a Gardner color of less than 1. The total sulfur content of the polymer was 4.1% with no detectable -SH.

EXAMPLE 2

To a one liter flask equipped with a stirrer, thermometer, reflux condenser, 2 dropping funnels and an air sparger were added 43 parts of butyl acrylate, 21 parts of styrene, 27 parts of hydroxyethyl acrylate and 9 parts of mercaptoethanol. To one dropping funnel were added 172 parts of butyl acrylate, 83 parts of styrene and 109 parts of hydroxyethyl acrylate. To the other dropping funnel were added 36 parts of mercaptoethanol. Heating and agitation were begun, and air, at the rate of about 21 cc/min. was introduced below the surface of the monomers. When the temperature in the flask reached 145°C., additions of the monomer mixture and the mercaptan were begun. All the monomer mixture was added over a period of 3 hours and 53 minutes while keeping the temperature at 140°-145°C. At this time the addition of mercaptoethanol was stopped with all but 8.1 parts having been added. Heating and air sparging were continued for 1 hour and 25 minutes, after which time the air sparge was stopped. The solids content was 93.1%. Heating was then continued for 32 additional minutes. The reactants were cooled and left over the weekend.

At the resumption of heating and stirring and, at a temperature of 146°C., addition of the remaining 8.1 parts of mercaptoethanol was continued as well as the air sparge. All of the mercaptan was added in 48 minutes. The air sparge was discontinued 11 minutes later. After an additional 3 hours at about 148°C., the solids content was found to be 94.8%. The flask was fitted with a downward condenser and vacuum was applied (oil pump) to remove residual monomers. The product (480 parts) had a viscosity (Gardner-Holdt at 25°C.) slightly above $Z_6$ and a Gardner color of about 1.

A blend of 14.4 parts of the copolymeric product with 5.6 parts of isophorone diisocyanate and 0.1 part of a 50% solution of dibutyl tin dichloride was prepared and 3 mil films were drawndown on Bonderite No. 37 steel panels. The films were tack free after standing overnight at room temperature and exhibited excellent gloss and adhesion to the substrate. After 12 days at room temperature the films exhibited good mar resistance and a pencil hardness of F-H.

EXAMPLE 3

To a 1 liter flask equipped as described in Example 2 were added 29 parts of styrene, 39 parts of butyl acrylate and 27 parts of acrylic acid. Heating, stirring and air sparging at a steady rate were begun and 5 parts of 3-mercaptopropionic acid were added. After 17 minutes heating a slight exotherm was noted at 118°C. When the temperature reached 128°C., 12 minutes after the exotherm was noted, addition of a blend of 116 parts of styrene, 156 parts of butyl acrylate and 108 parts of acrylic acid was begun from one dropping funnel and the addition of 20 parts of 3-mercaptopropionic acid was begun from the other funnel. All the monomers and all but 2.4 parts of the mercaptan, which was reserved for later addition, were added over a period of 3 hours and 35 minutes with the temperature rising to 148°C. The flask contents were heated at 147°-148°C. for 1 additional hour and were then cooled. After standing overnight, heat was applied and when the temperature reached 136°C, agitation was begun. One hour and 5 minutes later the temperature was 154°C. and the solids content was 97.7%. Due to this high conversion, the remaining 2.4 parts of 3-mercaptopropionic acid were not used. After an additional heating period (to 158°C.) of 3 hours and 58 minutes, the flask was fitted with a downward condenser and a vacuum was applied to remove residual monomers. The product (476 parts) was a brittle solid having an acid value of 207.

The acid containing copolymer was dissolved at 60% solids in a 1 to 1 xylene/Cellosolve acetate mixture. 13.5 parts of this solution were blended with 6.9 parts of diglycidyl orthophthalate having an epoxide equivalent weight of 154, and 1.2 parts of a 25% solids solution of triethylene diamine in ethyl Cellosolve. Films on Bonderite No. 37 steel panels were made from the blend using a 3 mil drawdown blade. The films were tack free in 3-4 hours. After 9 days at room temperature, the films exhibited fair mar resistance, good adhesion, and fair toughness.

EXAMPLE 4

To a 5 liter flask equipped with a stirrer, thermometer, reflux condenser, dropping funnel and air sparge were added 60 parts of methacrylic acid, 630 parts of hydroxypropyl acrylate, 1200 parts of butyl acrylate and 1110 parts of styrene. To the dropping funnel were added 300 parts of mercaptoethanol. Heating, stirring and air sparging, at a rate of 110 cc/min., were begun. After 1 hour and 20 minutes, and with the temperature at 75°C., 60 parts of mercaptoethanol were added from the dropping funnel. The remaining 240 parts of mercaptoethanol were added in 4 equal increments at half-hour intervals with the temperature gradually rising to 140°C. and being held between 140° and 150°C. After all the mercaptoethanol has been added, the temperature was held at 150°C. for 4 hours at which time the solids content was 90°C. The flask was then fitted with a downward condenser and the unreacted monomers were removed by heating to 180°C. under vacuum. The product when reduced to 82% solids with xylene had a Gardner-Holdt viscosity of $Z_2$-$Z_3$ at 25°C.

43.9 parts of the 82% solids solution of the copolymer were blended with 14 parts of hexa(methoxymethyl)melamine, 0.25 part of a 20 weight % solution of p-toluene sulfonic acid in ethanol, and 25.4 parts of xylene. Films were prepared on Bonderite No. 37 with a 3 mil drawdown blade and were baked at 121°C. for 30 minutes. Well cured films were obtained which had a pencil hardness of F-H, which passed an indirect impact test of 78 inch-pounds, which passed a 15 second xylene spot test but failed a 30 second test, and which withstood 1 hour in boiling water with only a small amount of yellowing. The coatings were unaffected by humidity after 10 days exposure in a Cleveland Humidity Cabinet at 100% relative humidity and water temperature of 120°F.

EXAMPLE 5

To a 1 liter flask equipped with thermometer, stirrer, reflux condenser, dropping funnel and air sparger were added 180 parts of hydroxypropyl methacrylate, 136.5 parts of styrene, 179.1 parts of ethyl acrylate and 4.4 parts of methacrylic acid. To the dropping funnel were added 50 parts of mercaptoethanol. Heating, stirring and air sparging at a rate of 22 ml./min. were begun. When the temperature reached 100°C., 10 parts of the mercaptoethanol were added. After 30 minutes with the temperature at 120°C., 10 parts more of mercaptoethanol were added. The remaining mercaptoethanol was added in three 10 part increments at 30 minute intervals with the temperature being held at 122°C. – 123°C. Heating at 123° was continued for 4 hours, at which time the conversion was 84%. The flask was equipped with a downward condenser and the unreacted monomers were removed by heating to 180°C. under vacuum. The product when reduced to 75 % solids in xylene had a Gardner-Holdt viscosity at 25°C. of $Z_2$–$Z_3$.

A blend of 40 parts of the 75% solids solution of the copolymer, 25 parts of a 60% solution of butylated methylol melamine in xylene and butanol, 8.3 parts of a 60% solution in xylene of a glycidyl polyether of bisphenol A having an epoxide equivalent weight of 500, and 26.7 parts of xylene was prepared. Films of the blend were prepared on Bonderite No. 1000 steel panels with a 3 mil drawndown blade and were baked at 163°C. for 35 minutes. The resulting well cured films had a pencil hardness of 2H-3H and the xylene resistance was greater than 5 minutes. The coatings were unaffected by humidity after 10 days exposure in a Cleveland Humidity Cabinet at 100% relative humidity and water temperature of 120°F.

EXAMPLE 6

Using the same procedure described in Example 5, 10 parts of methacrylic acid, 105 parts of hydroxypropyl methacrylate, 200 parts of butyl acrylate and 185 parts of styrene were copolymerized. These monomers were heated to 85°C. under agitation and with an air flow through the monomers of 22 cc./min. 10 parts of 1-thioglycerol were added and heating was continued. Thirty minutes after the addition, and at a temperature of 135°C., a second 10 parts of 1-thioglycerol were added. Three additional incremental additions of 10 parts each were made at 30 minute intervals while keeping the temperature at about 140°C. The components were then heated at 140°C. for a total of 10 hours at which time the solids content of the reactants was found to be 90%. The flask was fitted with a downward condenser and was heated at 170°C. for 4 hours under vacuum to remove unreacted monomer. The resulting polymer when reduced to 77 % solids with xylene had a Gardner-Holdt viscosity at 25°C. of $Z_2$–$Z_3$.

A blend was prepared from 46.8 parts of the copolymer solution, 14 parts of hexa(methyoxymethyl)melamine, 0.25 part of a 20% solution of p-toluene sulfonic acid in ethanol, and 22.5 parts of xylene. Films were drawndown on Bonderite No. 37 steel panels with a 3 mil doctor blade and were baked at 121°C. for 30 minutes. The resulting cured films had a pencil hardness of 2H-3H, and a xylene spot test resistance greater than 5 minutes.

EXAMPLE 7

Using the same procedure as described in Example 6, 10 parts of methacrylic acid, 105 parts of hydroxypropyl methacrylate, 200 parts of butyl acrylate and 185 parts of styrene were copolymerized with 50 parts of trimethylolethane tri(3-mercaptopropionate) added in 5 equal increments at a maximum temperature of 150°C. After the final addition of mercaptan, the reactants were heated at 150°C. for 2 hours. The product at this time had a solids content of 92%. The unreacted monomers were removed by distillation at 160°C. for 3 hours under vacuum. When diluted to 77% solids with xylene, the Gardner-Holdt viscosity at 25°C. was $Z_1$–$Z_2$.

A blend was prepared from 46.8 parts of the copolymer solution, 14 parts of hexa(methoxymethyl)melamine, 0.25 part of a 20% solution of para toluene sulfonic acid in ethanol and 22.5 parts of xylene. Films on Bonderite No. 37 steel panels were prepared with a 3mil drawdown blade and were baked at 121°C. for 30 minutes. The resulting cured films had a pencil hardness of F-H and an indirect impact resistance of 62 inch-pounds.

EXAMPLE 8

Using the same procedure described in Example 6, 10 parts of methacrylic acid, 105 parts of hydroxypropyl methacrylate, 200 parts of butyl acrylate and 185 parts of styrene were reacted with 50 parts of pentaerythritol tetra(3-mercaptopropionate) added in 5 equal parts to a maximum temperature at 160°C. After heating an additional 4 hours and 45 minutes at 160°C., the solids content was 94%. The unreacted monomers were removed by heating at 170°C. for 4 hours under vacuum. When reduced to 71% solids with xylene, the Gardner-Holdt viscosity at 25°C. was $Z_2$–$Z_3$.

A blend was prepared from 48 parts of the copolymer solution with 16 parts of hexa(methoxymethyl)melamine, 0.25 part of a 20% solution of para toluene sulfonic acid in ethanol and 19.3 parts of xylene. Films, prepared on Bonderite No. 37 steel panels using a 3 mil drawn-down blade and baked at 121°C. for 30 minutes, had a pencil hardness of F-H, an indirect impact of 24 inch-pounds and a xylene spot test resistance of 1-2 minutes.

EXAMPLE 9

Using the same procedure as described in Example 6, 10 parts of methacrylic acid, 105 parts of hydroxypropyl methacrylate, 200 parts of butyl acrylate and 185 parts of styrene were reacted with 50 parts of pentaerythritol tetrathioglycolate. The resulting product when reduced to 65% solids in xylene had a Gardner-Holdt viscosity at 25°C. of $Z_3$–$Z_4$.

Three mil films on Bonderite No. 37 steel panels were prepared from a blend of 55.4 parts of the copolymer solution, 14 parts of hexa(methoxymethyl)melamine, 0.25 part of a 20% solution of para-toluene sulfonic acid in ethanol, and 13.9 parts of xylene. After baking at 121°C. for 30 minutes the cured films had a pencil hardness of F-H, an indirect impact of 14 inch-pounds and a xylene spot test resistance of 30–45 seconds.

EXAMPLE 10

Using the same procedure described in Example 9, 10 parts of methacrylic acid, 105 parts of hydroxypropyl methacrylate, 200 parts of butyl acrylate and 185 parts of styrene were reacted with 50 parts of trimethylolpropane trithioglycolate. The resulting product when reduced to 73% solids with xylene had a Gardner-Holdt viscosity at 25°C. of $Z_2$–$Z_3$.

Three mil films were prepared on Bonderite No. 37 steel panels from a blend of 44 parts of the copolymer solution, 18 parts of hexa(methoxymethyl)melamine, 0.25 part of a 20% solution of para toluene sulfonic acid in ethanol, and 21.2 parts of xylene. After baking at 121°C. for 30 minutes the cured films had a pencil hardness of F-H, an indirect impact of 50 inch-pounds and a xylene spot resistance of 45 seconds to 1 minute.

EXAMPLE 11

Using the same procedure described in Example 6, 10 parts of methacrylic acid, 200 parts of butyl acrylate, 105 parts of hydroxypropyl methacrylate, and 185 parts of styrene were reacted using 50 parts of n-octyl mercaptan.

Blend was prepared from 45 parts of an 80% solution of the copolymer in xylene with 14 parts of hexa(methoxymethyl)melamine, 0.25 part of a 20% solution of para-toluene sulfonic acid in ethanol, and 24.3 parts of xylene. Films were prepared on Bonderite No. 37 steel panels using a 3 mil drawdown blade and were baked at 121°C. for 30 minutes. The resulting cured films had an indirect impact resistance of 160 inch-pounds and a pencil hardness of 2B-B.

EXAMPLE 12

To a 500 ml. flask equipped with a stirrer, condenser and thermometer were added 100 parts of acrylamide, 100 parts of water and 5 parts of 2-mercaptoethanol. Heating and stirring were begun raising the temperature to reflux (100°C.) Heating was continued for 1 hour and 22 minutes. The flask contents were quite viscous, so 50 parts of water were added. Heating was continued for 2 hours and 44 minutes. The resulting clear solution had a solids content of 41.5% and a Gardner-Holdt viscosity of $Z_4$ at 25°C.

EXAMPLE 13

To a one liter flask equipped with stirrer, thermometer, reflux condenser and air sparger were added 369.4 parts of methyl methacrylate, 19.4 parts of methacrylic acid and 31.5 parts of 1-butanethiol. Heating, agitation and an air flow of 21.2 ml./min. were begun. The temperature was raised to reflux, 100°C., and was held at reflux for 10 hours and 51 minutes, during which time the temperature rose to 162°C. The flask was fitted with a downward condenser to remove unreacted monomers by heating at 172°–174°C. for 2 hours under vacuum. The resulting product had an acid value of 31.6, and was a brittle solid, having a Durran's melting point of 104°C., which could easily be ground into a fine white powder.

EXAMPLE 14

Using the same procedure described in Example 9, 2 parts of methacrylic acid, 19 parts of hydroxypropyl acrylate, 41 parts of butyl acrylate and 38 parts of styrene were reacted with 15 parts of mercaptoethanol. The resulting product had a Gardner-Holdt viscosity of $Z_3$–$Z_4$ at 25°C.

Three mil films were prepared on Bonderite No. 37 steel panels from a blend of 32 parts of the copolymer, 18 parts of hexa(methoxymethyl)melamine and 0.25 part of a 20% solution of para toluene sulfonic acid in ethanol. After baking at 121°C. for 30 minutes, the cured films had a pencil hardness of F-H and a flexibility of 160 inch-pounds.

EXAMPLE 15

A suitable reactor was equipped as described in Example 2. Into one of the dropping funnels were added 2233 parts of ethyl acrylate and 952 parts of hydroxyethyl acrylate. Into the other dropping funnel were added 315 parts of 3-mercaptopropionic acid. 400 parts by volume (mls.) of the monomer mixture were introduced into the flask, heating and agitation were begun and an air flow of 43 cc/min. was started. When the temperature reached 93°C., addition of the 3-mercaptopropionic acid was begun. After 20 minutes about 35 parts of the 3-mercaptopropionic acid had been added. Dual feed of monomers and mercaptan was then begun while holding the temperature at 102°–114°C. All of the monomers and all but about 20 parts of the mercaptan were added over a period of 5 hours. The addition of mercaptan was stopped and heating was continued for about 1 hour. The mercaptan was then added over a 55 minute period. Thirty minutes later, the air flow was stopped. Heating was continued for 3 hours and 35 minutes with a temperature at 116°C. A downward condenser was attached and full aspirator vacuum was applied to distill unreacted monomer for a period of one hour and 14 minutes. The resulting product had an acid value of 46.5 and was a viscous but pourable liquid.

A solution was made from 24 parts of the copolymer, 6 parts of hexa(methoxymethyl)melamine, 1.46 parts of diethyl amine and 12.9 parts of water. The solution (70% solids) had a Gardner-Holdt viscosity of U-V at 25°C. A 3 mil film was drawn down on a steel panel and was baked at 177°C. for 30 minutes. The resulting film had excellent gloss, excellent mar resistance and a pencil hardness of HB-F.

EXAMPLE 16

Using the same procedure as described in Example 2, 1 a copolymer was made from 152.5 parts of styrene, 152.5 parts of n-butyl acrylate, 150 parts of 2-hydroxypropyl methacrylate and 45 parts of 2-mercaptoethanol. 25 parts of the copolymer were blended with 12.5 parts of a triol polyester made by controlled polymerization of caprolactone and having an average molecular weight of 540, and 12.5 parts of hexa(methoxymethyl)melamine. The resulting blend was a clear solution having a Gardner-Holdt viscosity of $Z_3$–$Z_4$ at 25°C. Two mil films were drawn down on steel panels and were baked at 177°C. for 30 minutes. The films were well cured and exhibited excellent mar resistance, fair toughness and a pencil hardness of F-H. Comparable hardness were obtained when the polyester in the blend was replaced with a triol polyether made by reacting trimethylolpropane with propylene oxide to an average molecular weight of 740.

It is understood that the foregoing detailed description is given merely by way of illustration and that many variations can be made therein without departing from the spirit of this invention.

The embodiments of this invention in which an exclusive privilege or property is claimed are:

1. A polymerization process which consists essentially of contacting polymerizable ethylenically unsaturated monomers with from about 0.01 to about 0.3 equivalent per mole of monomers of an organic aliphatic, cycloaliphatic, or aromatic mercaptan having from 1 up to about 4 thiol groups per molecule and from 1 to about 12 carbon atoms per thiol group in the presence of oxygen introduced below the surface of the monomers in an amount sufficient to keep a stream of bubbles containing oxygen in contact with the monomers at a temperature of from about 20°C. to about 200°C. for a time sufficient to obtain substantially complete conversion of the monomers to polymer, wherein the monomers are selected from at least one member of the group consisting of (a) polymerizable organic compounds containing a single ethylenic double bond conjugated with a carbon oxygen double bond, (b) polymerizable organic compounds containing a single ethylenic double bond conjugated with a carbon to nitrogen triple bond, and (c) polymerizable organic compounds containing a single ethylenic double bond conjugated with a carbon atom in an aromatic nucleus.

2. The process of claim 1 wherein the organic mercaptan contains from 2 to 8 carbon atoms per thiol group.

3. The process of claim 1 wherein the organic mercaptan contains substituted selected from the group consisting of carboxylic acid groups, hydroxyl groups, ether groups, ester groups, sulfide groups, amine groups and amide groups.

4. The process of claim 1 wherein the oxygen is introduced as air.

5. The process of claim 1 wherein the polymerization is conducted in the absence of solvent.

6. The process of claim 5 wherein the polymerizable monomers are a mixture of styrene, butyl acrylate, beta-hydroxypropyl methacrylate, and methacrylic acid, and the mercaptan is mercaptoethanol.

7. The process of claim 5 wherein the polymerizable monomers are a mixture of ethyl acrylate and beta-hydroxyethyl acrylate, and the mercaptan is 3-mercaptopropionic acid.

8. The process of claim 5 wherein the temperature is from 80°C. to 150°C.

9. An organic solvent solution polymerization process which consists essentially of contacting a monomeric system of a polymerizable amide and an ethylenic compound copolymerizable with said amide, with an initiator system of from about one to about 8 percent, based upon the total weight of monomers, of an alkyl, or hydroxyl, acid, ether, amine or ester group-substituted alkyl mercaptan having from 1 to 4 thiol groups per molecule and from 1 to 7 carbon atoms per thiol group, or benzyl mercaptan and oxygen, wherein the polymerization is carried out in air as a source of oxygen, at a temperature of from about 20°C. to about 200°C.

* * * * *